United States Patent [19]

Andrews et al.

[11] Patent Number: 4,596,986

[45] Date of Patent: Jun. 24, 1986

[54] SIDELOBE CANCELLER WITH ADAPTIVE ANTENNA SUBARRAYING USING A WEIGHTED BUTLER MATRIX

[75] Inventors: Grealie A. Andrews, Lanham; Karl Gerlach, Ft. Washington, both of Md.

[73] Assignee: The United States of America as represented by the Secretary of the Navy, Washington, D.C.

[21] Appl. No.: 527,529

[22] Filed: Aug. 29, 1983

[51] Int. Cl.$^4$ ............................ G01S 3/16; H01Q 3/40
[52] U.S. Cl. ................................... 343/373; 343/379
[58] Field of Search .............................. 343/371–373, 343/379–382

[56] References Cited

U.S. PATENT DOCUMENTS 4,170,775 10/1979 Masak et al. .
4,236,158 11/1980 Daniel .
4,338,605 6/1982 Mims .................................. 343/373

Primary Examiner—Thomas H. Tarcza
Assistant Examiner—Mark Hellner
Attorney, Agent, or Firm—Robert F. Beers; Sol Sheinbein; Charles E. Krueger

[57] ABSTRACT

An apparatus for nulling signals from unwanted interference sources. The apparatus includes an N element antenna array interconnected with a weighted Butler matrix. The outputs of the Butler matrix are applied to an adaptive reducing matrix having outputs $(x_2, \ldots, x_L)$, with $L<N$, where is the main antenna channel signal, $x_1$, and $(x_2, \ldots, x_L)$ are the signals required to null the effects of jammer signals received in the sidelobes of the main antenna channel. The signals $(x_1, \ldots, x_L)$ are directed to the inputs of a sidelobe canceller.

6 Claims, 10 Drawing Figures

ANOTHER IMPLEMENTATION

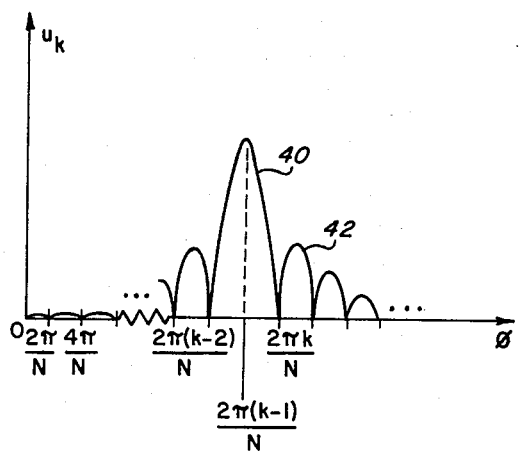
FIG. 4
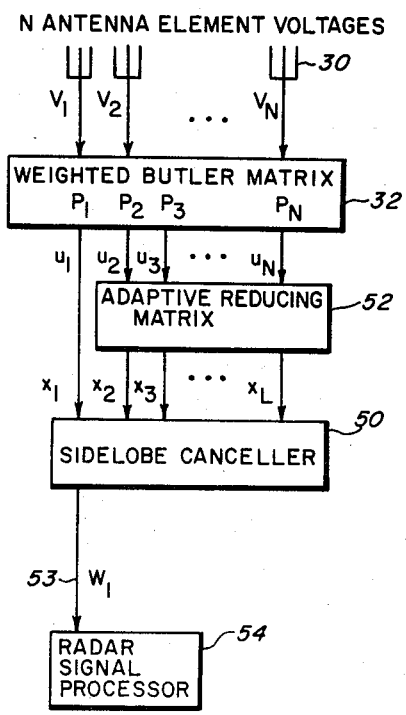
FIG. 5
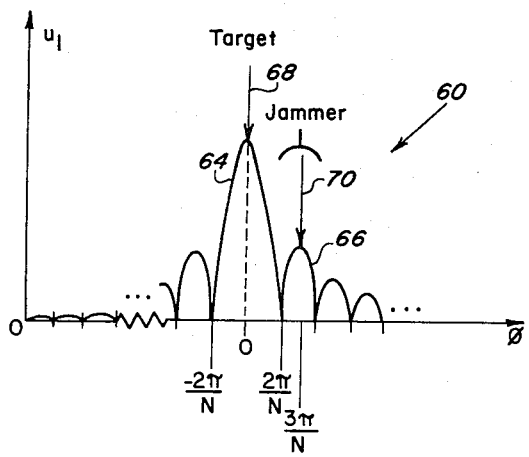
FIG. 6
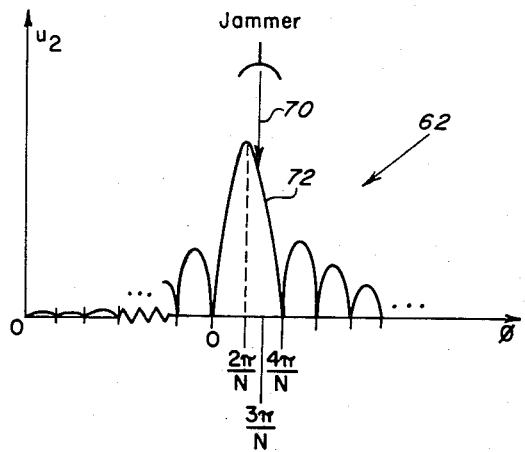

PLANAR ARRAY

IMPLEMENTATION OF WBM FOR PLANAR ARRAY (3×3)

SIDELOBE CANCELLER WITH ADAPTIVE ANTENNA SUBARRAYING USING A WEIGHTED BUTLER MATRIX

BACKGROUND OF THE INVENTION

1. Field of the Invention

The present invention relates generally to an antenna array with adaptive sidelobe cancellation and more particularly to a beam space antenna array with adaptive subarraying.

2. Description of the Prior Art

The need for early and accurate detection of hostile targets has created a need for radar antennas that will function in the presence of incoming signals from unwanted interference sources (jammers). Jamming signals received in the sidelobes of the antenna obsure target echos in the mainlobe. Thus, jammer signals received in the antenna sidelobes must be cancelled or nulled in order to effectively detect targets.

A fully adaptive array may be utilized to achieve sidelobe cancellation. An adaptive array is an antenna that senses the received signal illuminating its aperture and adjusts the phase and amplitude of the aperture illumination to achieve some desired performance criterion. In a fully adaptive array each antenna element has a separate adaptive weight setting. A fully adaptive sidelobe canceller has the theoretical capability of nulling a large region in spaced. However, the large number of degrees of freedom in a fully adaptive array increase the complexity and convergence time of the adaptive network.

Further, fully adaptive antenna arrays may be configured as beam space systems wherein each of the output ports responds to a signal source in a predetermined angular direction relative to the array. This is accomplished by utilizing a phase shifting device, preferably a Weighted Butler Matrix, that has a plurality of input ports and output ports where each of the input ports is coupled to a respective antenna element. The phase shifting device generates an orthogonal set of subbeams, each responding to a particular output port of the Weighted Butler Matrix. One of the subbeams is regarded as the main beam (or main channel) while the other subbeams are adaptively weighted by a multiple sidelobe canceller to form a cancellation beam which is subtracted from the main beam. This cancellation beam cancels signals incident on the sidelobes of the main channel. Each of the other subbeams that feed the multiple sidelobe canceller has a null in the direction of look of the main beam; and therefore, the output has a constant response to the direction of look of the main beam.

The beam space fully adaptive array is particularly advantageous in that it discriminates effectively against interfering noise sources in the near-in sidelobe regions, which includes the sidelobes near the main beam of the antenna pattern, as well as in the far sidelobe region which includes those sidelobes farthest from the main beam of the antenna.

However, such fully adaptive beamspace arrays require extensive hardware in their implementation, in that an adaptive circuit is required for each of the individual antenna elements. Additionally, for an antenna with a large number of elements, N, the adaptive processor must perform the equivalent of solving a set of N simultaneous linear equations. The convergence rate of the solution to these equations becomes prohibitively slow as N increases.

In order to reduce the degrees of freedom, i.e., input signals to the sidelobe canceller, and to increase the convergence rate, a partially adaptive beam space system may be utilized.

In a partially adaptive array either a small number of the total antenna elements are provided with adaptive circuitry or the elements are controlled in groups (subarraying). If only a small number of elements are controlled these elements are designated auxiliary elements.

However, if only auxiliary elements are chosen as inputs to the sidelobe canceller, jammer nulling is effected by the bandwidth-aperture product, i.e., if the number of antenna elements is held constant, as the bandwidth of the jammer or the size of the antenna aperture in terms of wavelengths or the spacing of the auxiliary elements is made larger, the nulling of the jammer is degraded. This degradation results because as auxiliary antenna elements are spaced farther apart the input noise signal with a spread spectrum becomes more uncorrelated between elements. However, it is the correlation between the signals on the respective antenna elements that allows the adaptive array to sense the direction of arrival of an undersirable signal and then place a null in the main channel sidelobe oriented in the direction of that undesirable signal.

Thus, these partially adaptive antenna systems are capable of discriminating against at most only that number of undesirable signal sources that correspond to the number of selected antenna elements, and will not fully be effective in discriminating against more than this number within the field of view of the antenna array. Additionally, these systems increase the sidelobe level of the main channel due to the spacial ambiguity of the undesired signal with respect to the auxilary antenna elements.

OBJECTS OF THE INVENTION

Accordingly, it is an object of the present invention to reduce the degrees of freedom and decrease the convergence time of a beamspace adaptive sidelobe reduction system without decreasing the number of jammer signals that can be nulled.

It is a further object of the present invention to reduce the degrees of freedom and decrease the convergence time of the beamspace adaptive sidelobe reduction system without significantly decreasing the signal-to-noise ratio that would be possible if a fully adaptive antenna were used.

It is still a further object of the invention to reduce the degrees of freedom and decrease the convergence time of the beamspace adaptive sidelobe cancellation system without increasing the adverse effects of the bandwidth-aperture product on jammer nulling.

SUMMARY OF THE INVENTION

The above, and other objects, are achieved in the present invention which includes a beamspace array with an N element antenna array interconnected with means for generating a set of subbeams with output functions $u_k$. The $u_k$'s are processed to select $u_1$ as the main channel and to select a nulling subset that includes only those $u_k$'s required to null the effects of jammer signals in the sidelobes of the main channel. These $u_k$'s in the nulling subset are then processed by a sidelobe canceller.

One exemplary embodiment includes an N element linear antenna array with the output of each element of the array equi-spaced and connected to a respective input port of an N×N weighted Butler Matrix (WBM). An adaptive reducing matrix with N inputs connected to respective outputs of the weighted Butler matrix receives the Butler output signals ($u_2, \ldots, u_N$) and generates $L-1$ output nulling signals ($x_2, \ldots, x_L$) with $L < N$. The signal $x_1 = u_1$ functions as the mainbeam (or main channel) of the antenna. The nulling signals ($x_2, \ldots, x_L$) correspond to the $u_k$'s required to null jamming signals in the antenna mainbeam sidelobes. The signals ($x_1, \ldots, x_L$) are received by the input ports of a sidelobe canceller which cancels the jamming signals received in the main channel via the antenna sidelobes.

The function of the WBM is to partition the field of view of the antenna into a set of orthogonal, spatially distinct subbeams. The adaptive reducing matrix selects only the output functions, $u_k$, of subbeams with jammers positioned therein for processing by the sidelobe canceller.

Thus, the number of signals to be processed by the sidelobe canceller is determined by the number of jamming signals present. Accordingly, there is no reduction in the number of signals that can be nulled as compared to the fully adaptive array. Additionally, by selecting subbeams with jammers positioned therein for further processing the maximum signal-to-noise ratio of the system is not significantly decreased. Finally, note that all the antenna elements are utilized to form each subbeam, thus jammer nulling degradation due to the bandwidth-aperture product of the antenna is not increased.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a graph of the response function of the output $u_k$.

FIG. 5 is a block diagram of the invention.

FIG. 6 is two graphs of the output functions for $u_1$ and $u_2$, respectively, with jammer and incident signals depicted thereon.

DESCRIPTION OF THE PREFERRED EMBODIMENTS

The present invention is a method and apparatus for subarraying a beamspace adaptive sidelobe cancelling system.

Figure 1:
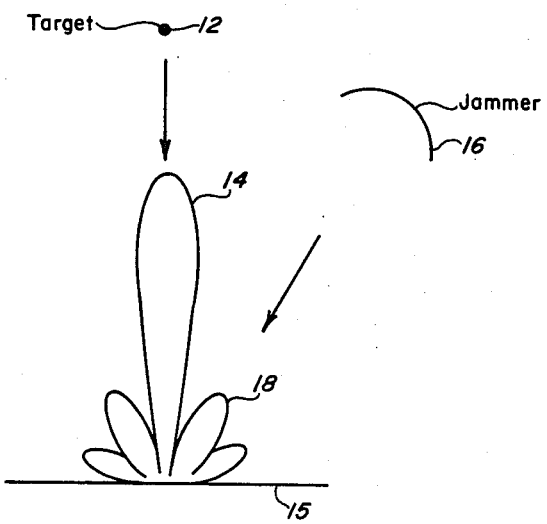
FIG. 1 is a schematic diagram of a target and a jammer positioned relative to the lobes of an antenna.
Figure 2:
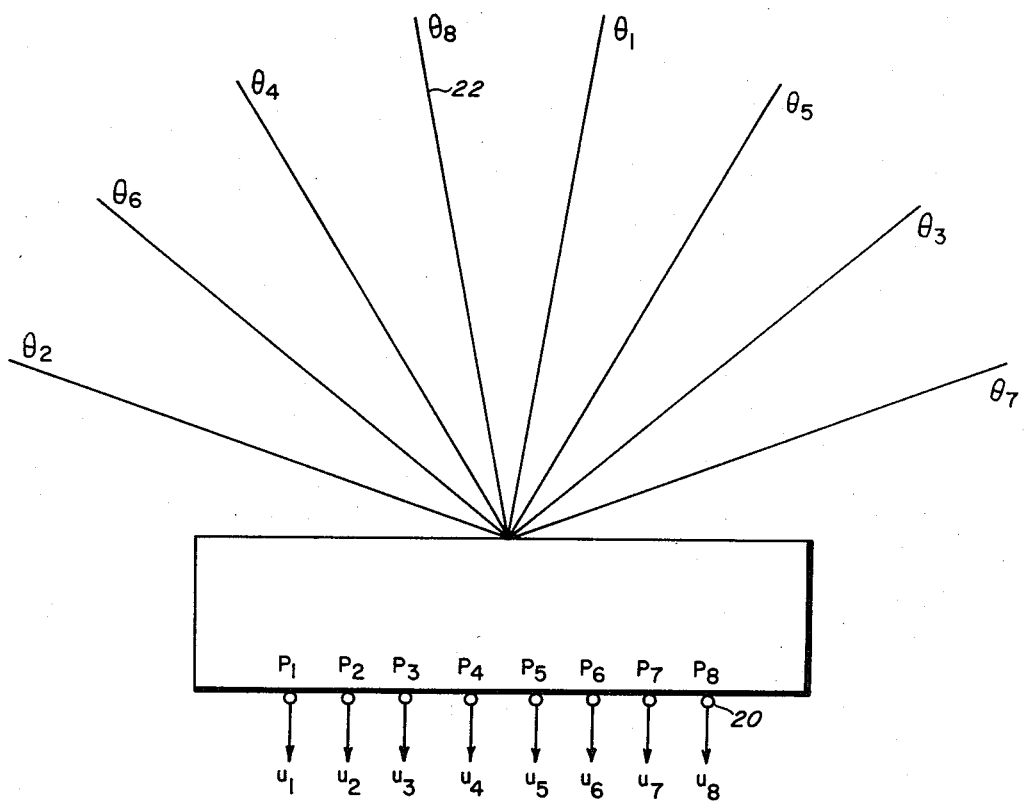
FIG. 2 is a schematic diagram of a beamspace array.

In order to better understand the invention a brief description of the jamming problem is presented with reference to FIG. 1 along with a brief description of a beamspace array with reference to FIGS. 2, 3 and 4.

Figure 8:
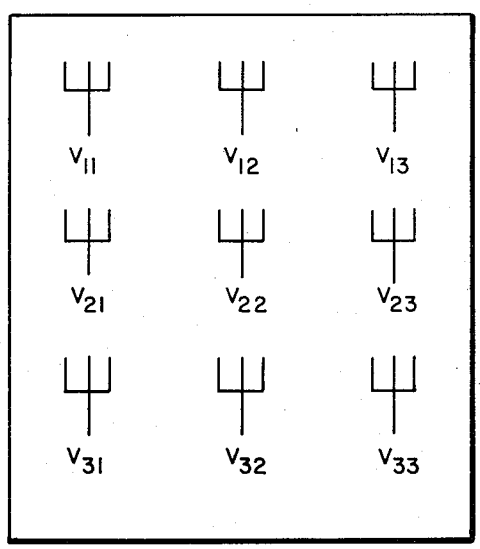
FIG. 8 is a schematic diagram of rectangular planar antenna array.
Figure 9:
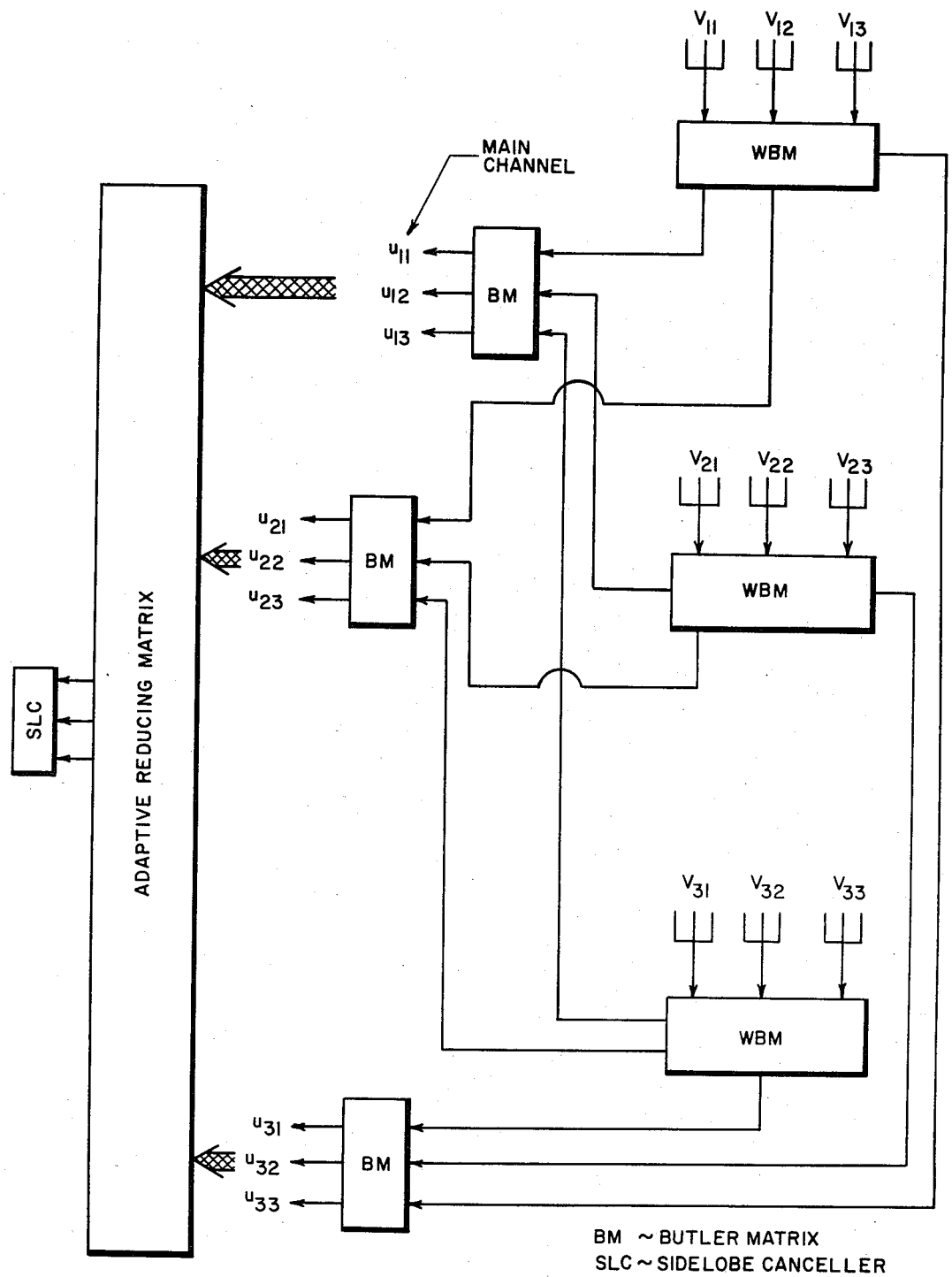
FIG. 9 is a schematic diagram of a Butler matrix interconnected with a planar antenna array.

Following this introduction, a general description of the invention is presented with reference to FIGS. 5 and 6 while the preferred embodiments are described with reference to FIGS. 7, 8, and 9.

Referring now to the drawings, wherein like reference numerals designate identical or corresponding parts throughout the several views, and more particularly to FIG. 1 thereof, a diagram depicting a typical jamming problem is presented. A signal comprising a reflected radar pulse from a target 12 enters the mainlobe 14 of an antenna 15 and is processed by the radar system. The angular position of the antenna mainlobe 14 is known from the spatial orientation of the antenna 15 and the range to the target 12 is known from the time interval between the transmission and reception of a radar pulse. However, a signal from a jammer 16 received in the antenna sidelobes 18 will also be processed by the radar and can mask the signals reflected from the target 12. This masking makes accurate detection of the target 12 difficult or impossible. A coherent sidelobe canceller is a system for generating a nulling signal that, when subtracted from the antenna input signal, cancels the jammer signal entering the antenna sidelobes 18.

As stated above, the present invention utilizes a beamspace array. FIG. 2 is a schematic diagram of a beamspace array having eight output ports 20 with corresponding output signals ($u_1, \ldots, u_8$) and eight subbeams 22 at angles ($\theta_1, \ldots, \theta_8$). If the output ports 20 of the beamspace array are uniformly illuminated by an electromagnetic signal then the signal energy is equally distributed among the eight subbeams 22. Note that each subbeam 22 has a mainlobe and sidelobes. The actual form of the subbeam output function is described more fully below. If only one output port 20 is illuminated, e.g. port P2, then the signal energy will be radiated into the mainlobe of the subbeam 22 at $\theta_2$ and into the sidelobes of the other subbeams 22. The gain of a mainlobe is much greater than a sidelobe, thus, most of the energy incident at port P2 is radiated in the direction $\theta_2$.

Similarly, the energy received from a source at angular position $\theta_2$ will appear in the mainlobe of the output response function $u_2$ and in the sidelobes of the other output response functions. Thus, most of the received energy with a direction-of-arrival (DOA) of $\theta_2$ will be outputted through port P2.

Figure 3A:
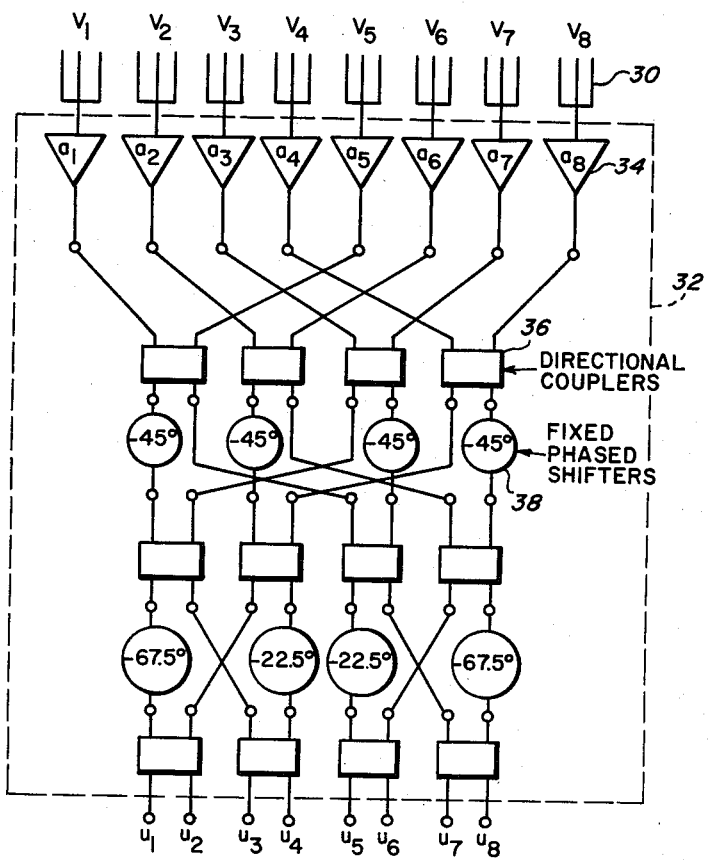
FIGS. 3A and 3B are schematic diagrams of an analog and a digital embodiment, respectively, of a weighted Butler matrix.
Figure 3B:
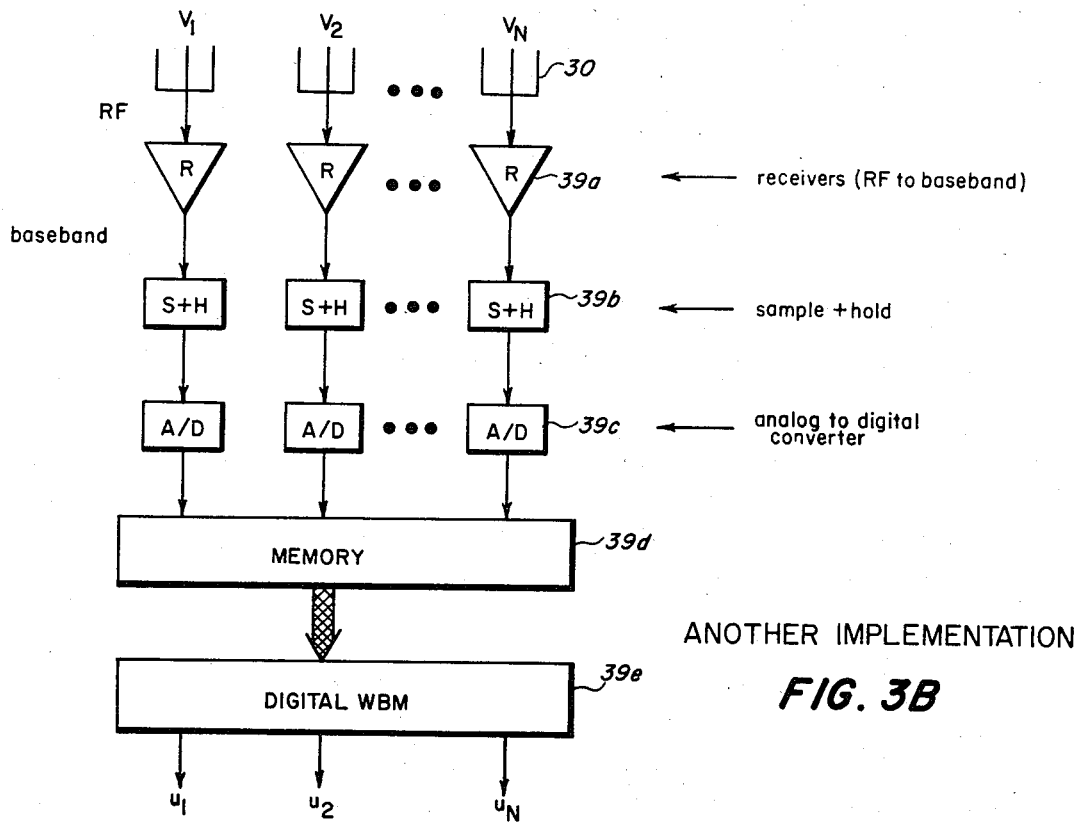

Two actual embodiments of a linear beam forming network are depicted in FIGS. 3A & 3B. Referring now to FIG. 3A, eight equispaced antenna elements 30 producing signals ($V_1, \ldots, V_8$) respectively, are applied to a weighted Butler matrix (WBM) 32. The WBM includes eight multipliers 34, twelve directional couplers 36, and eight fixed phase shifters 38. An eight element WBM is depicted by way of example, not limitation. Butler matrices are fully described in the book entitled *Introduction to Radar Systems*, McGraw Hill, N.Y. 1980, pp. 311–314 by M. Skolnik and in the references cited therein.

For the general case with N inputs and N outputs the output $u_K$ is related to the inputs $V_n$ by the formula:

$$u_k = 1/\sqrt{N} \sum_{n=0}^{N-1} a_n V_n \Gamma^{(k-1)n} \text{ for } k = 1, \ldots, N \quad (1)$$

where $$\Gamma_n = e^{-j2\pi/N}, j = \sqrt{-1}$$

and $a_n$ are weighting factors. These weighting factors may be varied to steer the mainbeam or to control the mainbeam sidelobes. Note that eq. (1) may be implemented by a digital processor replacing the analog system depicted in FIG. 3A. A schematic diagram of a digital beam forming network is depicted in FIG. 3B. Referring now to FIG. 3B, the signal from each antenna element 30 is directed to a receiver 39a, a sample and hold circuit 39b, and an A/D convertor 39c connected in series. The digital signals from the A/D convertors 39c are stored in a memory 39d and then processed in a digital WBM 39e to generate the output functions ($u_1, \ldots u_N$).

A jammer located $\theta_J$ degrees from the antenna normal transmitting signal with wavelength $\lambda_J$ will generate a set of $V_i$'s equal to:

$$V = (1, e^{j\phi}, e^{j2\phi}, \ldots, e^{j(N-1)\phi})^T \tag{2}$$

where $$\phi = \frac{2\pi d}{\lambda_J} \sin \theta_J \tag{3}$$

and where d is the spacing between antenna elements.

The output response for the $V_i$'s of eq. (2) is $$|u_k|^2 = \frac{\sin^2 \frac{N(\alpha - \phi)}{2}}{\sin^2 \frac{\alpha - \phi}{2}}; \alpha = \frac{2\pi(k-1)}{N} \tag{4}$$

The output function defined by eq. (4) is graphed in FIG. 4 as a function of $$\phi = \frac{2\pi d}{\lambda_J} \sin \theta_J.$$

Note that the response function for $u_k$ has a mainlobe 40 centered at $\phi = 2\pi(k-1)$ and sidelobes 42 equally spaced by $\Delta\phi = 2\pi/N$. Utilizing eq. (3) the angular position of the mainlobe of the subbeam corresponding to $u_k$ is:

$$\phi_k = \sin^{-1}\left[\frac{(k-1)\lambda_J}{Nd}\right] \tag{5}$$

Note that for a given array, i.e., N and d fixed, $\phi_k$ depends on k and the wavelength (or equivalently frequency) of the incoming signal. Thus, an incoming signal with a wide bandwidth $\Delta f$ could be received in the mainlobes of several adjacent subbeams.

The present invention will now be described with reference to FIGS. 5 and 6. Referring first to FIG. 5, a WBM 32 with its N inputs connected N antenna elements 30 has its N outputs connected to a sidelobe canceller 50 via an adaptive reducing matrix 52. Note that the output function $u_1$, which functions as the antenna mainbeam, is routed directly to the sidelobe canceller 50. The remaining outputs ($u_2, \ldots, u_N$) are routed to the inputs of the adaptive reducing matrix 52. Only those outputs necessary to null the jammer ($x_2, \ldots, x_L$) are directed to the canceller 50 from the adaptive reducing matrix 52.

The output beam, $W_1$ 53, from the canceller 52 is the mainbeam with jamming signals in the sidelobes cancelled therefrom. This output beam 53 is directed to the input of the radar signal processor 54.

Note that the mainbeam $u_1$ is of the form:

$$x_1 = u_1 = \sum_{k=1}^{N} a_k V_k \tag{6}$$

which follows from eq. (1). Thus, as is well known to persons skilled in the art, the channel weights, $a_k$, may be specified to control the steering, sidelobe level, or bandwidth of the antenna. In the discussion that follows the mainbeam is directed broadside with $\theta = 0$.

The operation of the reducing matrix and sidelobe canceller for a single-frequency jammer with $$\theta_J = \frac{2\pi d}{\lambda_J}$$

sin $\theta_J$ will now be described with respect to FIGS. 6 and 7. Referring now to FIG. 6, graphs of the output response functions of $u_1$ and $u_2$ 60 and 62 are depicted. Referring to the graph of $u_1$ 60, note that the mainlobe peak 64 is at $\phi = 0$ and that the first sidelobe peak 66 is at $\phi = 3\pi/N$. The gain of the mainlobe 64 is equal to one while the gain of the sidelobe 66 is equal to $g_1$ where $g_1 << 1$. If a target echo 68 received in the mainlobe has amplitude T then the signal at output port P1 corresponding to the target has amplitude T. Assume now that $\phi_J$ of a jammer signal 70 is equal to $3\pi/N$ and that the amplitude of the jammer signal 70 if J. Then the signal from output port P1 corresponding to the jammer will have amplitude $g_1 J$. This jammer signal adds to target signal and may obscure the target signal completely.

Note that the jammer signal enters the mainlobe 72 of $u_2$. Thus, the output signal at output port P2 corresponding to the jammer has amplitude J. The sidelobe canceller 50 multiplies this output signal from output port P2 by the proper amplitude and phase and subtracts the resulting signal from the signal from output port P1 thereby nulling the effect of the jammer.

Note also that only those subbeams receiving jamming signals need to be processed in order to achieve jammer nulling. The adaptive reducing matrix 52 of FIG. 5 selects the subbeams receiving jamming signals with power above a given threshold, i.e., ($x_2, \ldots, x_L$) and directs only these signals to the inputs of the sidelobe canceller. The mainbeam with cancellation 53, $W_1$, is directed to the input of the signal processor 54.

A digital embodiment of the adaptive reducing matrix will now be described with reference to FIG. 7. First, however, note that description of the operation of the adaptive reducing matrix and sidelobe canceller set forth above is oversimplified because it was assumed that the jammer only radiated at a single frequency. In actual practice the jammer radiates power over a finite bandwidth. Additionally, the bandwidth of the radar system is limited by the bandwidth of the receiver. These factors are accounted for in the adaptive reducing matrix described below.

Figure 7:
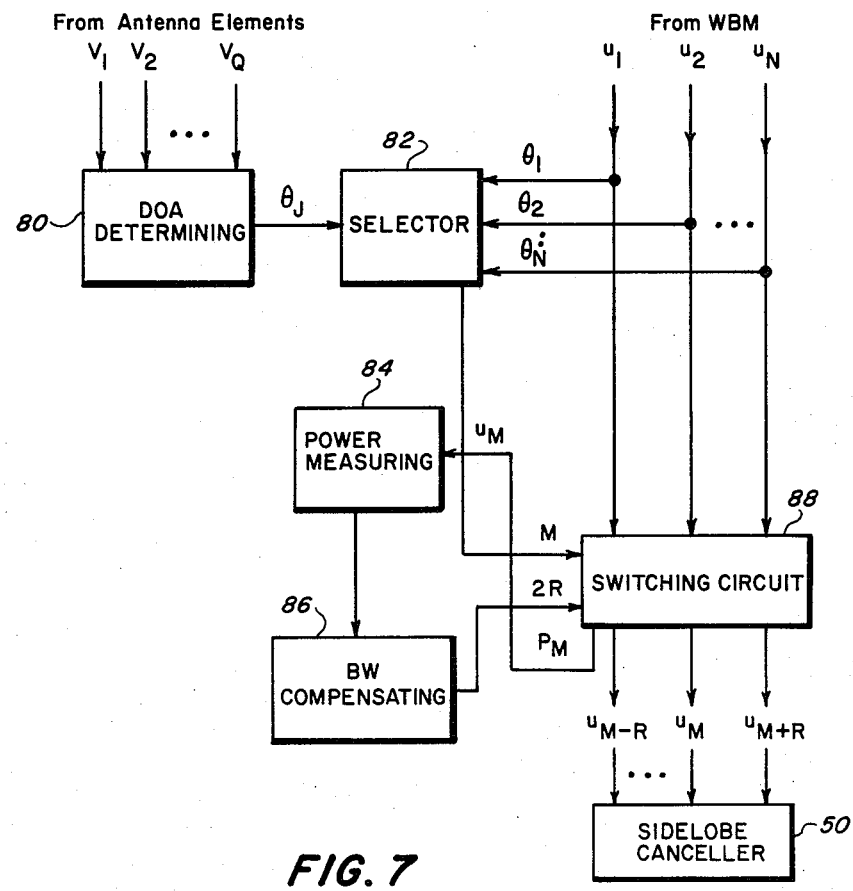
FIG. 7 is a block diagram of the adaptive reducing matrix.

Referring now to FIG. 7, he adaptive reducing matrix includes a direction-of-arrival (DOA) determining circuit 80 for determining the DOA's of a jamming signal, a selector circuit 82 for selecting the $u_M$ corresponding to a subbeam with the maximum jammer power positioned in the mainlobe thereof, a power measuring circuit 84 for measuring the power ($P_M$) of $u_M$, a bandwidth compensating circuit 86 for determining the number (2R) of $u_k$'s adjacent to $u_M$ required to null the jammer, and a switching circuit 88 for directing $u_M$ and the required number of $u_K$'s ($u_{M-R}, \ldots u_M, \ldots u_M, \ldots +R$) which comprise the nulling subset, to the inputs of the sidelobe canceller 50.

Circuits for determining the DOA's of the jammers are well-known in the art and are described in the following references:

1. W. F. Gabriel, "Spectral Analysis and Adaptive Array Superresolution Techniques," *Proc. IEEE* 68, 654–666 (June 1980).

2. D. G. Childers, ed., *Modern Spectrum Analysis*, IEEE Press, New York, 1978.

3. R. A. Monzingo and T. W. Miller, *Introduction to Adaptive Arrays*, John Wiley & Sons, New York, 1980.

4. M. A. Alam, "Orthonormal Lattice Filter—A Multistage Multichannel Estimation Technique," *Geophysics* 43, 1368–1383 (December 1978).

5. A. H. Nuttall, "Spectral Analysis of a Univariate Process with Bad Points, via Maximum Entropy and Linear Predictive Techniques," NUSC-TR-5303, Naval Underwater Systems Center, New London, March 1976.

6. L. Marple, "A New Autoregressive Spectrum Analysis Algorithm," *IEEE Trans. Acoust., Speech, Signal Process.* ASSP-28, 441–454 (August 1980).

7. R. Schmidt, "Multiple Emitter Location and Signal Parameter Estimation," *Procedings of the RADC Spectrum Estimation Workshop*, RADC-TR-79-63, Rome Air Development Center, Rome, N.Y., October 1979, p. 243.

8. E. Bienvenu and L. Kopp, "Adaptive High Resolution Spatial Discrimination of Passive Sources," *Underwater Acoustics and Signal Processing*, D. Reidel Publishing Co., Boston, 1981, pp. 509–515.

9. S. M. Kay and S. L. Marple, Jr., "Spectrum Analysis—A Modern Perspective," *Proc. IEEE* 69, 1380–1419 (November 1981).

It is only necessary to use a subaperture of the total array to determine accurately the DOA's. In addition, these DOA's need be only updated periodically due to the slow change they exhibit with respect to time. The DOA's are digitized and inputted into the selector circuit 82.

The selector circuit 82 calculates the value of $\beta_k$ where $$\beta_k = |\theta_k - \theta_J| \, k=2, \ldots, N$$

and selects the $\beta_k$ such that $\beta_k$ is minimized. This minimized value of k is set equal to M. If more than one jammer is present the above described process is repeated for each jammer. The value of M is transferred to the switching circuit 88 and the output function $u_M$ is directed to the input of the power measuring circuit 84 where the power, $P_m$, of $u_M$, is measured, digitized and transferred to the input of bandwidth compensating circuit 86.

The principles of operation of the bandwidth compensating circuit 86 will now be described. For a jammer with signal strength spread over a bandwidth, $\Delta f$, the range of $\Delta 100$ is equal to $$\frac{2\pi d \Delta f}{\lambda_J} \sin \theta_J.$$

Thus the jammer signal can enter several sidelobes of $u_M$ and the mainlobes of several $u_k$'s adjacent to $u_M$. It is well known that the number of degrees of freedom necessary to null a jammer is a deterministic function of the:

(1) radar system bandwidth;
(2) radar system carrier frequency;
(3) number of array elements;
(4) array element physical spacing;
(5) array element antenna pattern;
(6) jammer direction at arrival (DOA); and
(7) jammer power.

See, for example, the articles by W. F. Gabriel, "Adaptive Array-An Introduction", *Proc. of IEEE*, 64, 239–272, February 1976 and Karl Gerlach, "On the Number of Degrees of Freedom Used by an Adaptive Antenna Array in a Non-Narrowband Noise Environment," NRL Report 8632, Sept. 30, 1982. The first five quantities listed are system characteristics that are known a priori and do not change with time. The last two parameters are jammer signal characteristics that can be measured. The jammer DOA is measured via methods in the articles previously cited. The jammer power can be calculated approximately from the value of $P_M$ measured in the power measuring circuit 84. This is due to the fact that Butler matrix subarraying in itself is a method of measuring the angular power spectrum. Since the first five characteristics are constant, a lookup table of "number of degrees of freedom needed" versus jammer power and DOA can be computed offline as described in the abovereferenced Gabriel and Gerlach articles, which are hereby incorporated by reference, and inputted as part of the software controlling the Adaptive Reducing Matrix. This lookup table consists of a domain of contiguous discrete values of jammer power and DOA versus the functionally deterministic integer value of number of degrees of freedom needed. The measured value of jammer power and DOA are matched as closely as possible to the look-up table values of jammer power and DOA. The resultant values are employed as input parameters to the look-up table with the specified number of degrees of freedom needed, D, set equal to 2R+1. Thus $$R = \left[ \frac{D-1}{2} \right] \quad (7)$$

where [.] is the least integer function.

For example, these values of 2R may be calculated for a spectrum of power values ($P_1, \ldots, P_Q$) and stored in a read only memory in the bandwidth compensating circuit 86. The $P_i$ nearest to the measured $P_M$ is determined and the 2R values associated with the $P_i$ are transferred to the switching circuit 88. The switching circuit 88 then directs the nulling output functions ($u_{m-R}, \ldots, u_M, \ldots, u_{M+R}$) to the sidelobe canceller.

The sidelobe canceller and included adaptive circuitry are well-known in the art and not part of the present invention. These sidelobe cancellers are described in detail in the following references:

1. S. P. Applebaum, "Adaptive Arrays," IEEE Transactions on Antennas and Propagation, AP-24, pp.

585–589, September 1976; also Syracuse Univ., Res. Corp., Rep. SPL TR 66-1, August 1966.

2. P. W. Howells, "Intermediate Frequency Side-Lobe Canceller," U.S. Pat. No. 3,303,990, Aug. 24, 1965 (filed May 4, 1959).

3. B. Widrow, P. E. Mantey, L. J. Griffiths, and B. B Goode, "Adaptive Antenna Systems," *Proc.* IEEE, 55, pp. 2143-2159, December 1967.

The above described embodiment realizes many advantages over existing systems. The use of a beamspace array tends to orthogonalizes the jammer inputs. By selecting only $u_k$'s with jammer signals therein for processing the number of inputs to the sidelobe canceller is reduced without significantly degrading signal-to-noise ratio characteristics. Additionally, the adverse effect of increasing the bandwidth-aperture product is reduced because all the antenna elements of the array are utilized to form the reduced number of inputs to the sidelobe canceller.

Note that while a digital embodiment has been described above, the invention is easily synthesized in either an analog or digital form.

Additionally, the principles of the invention disclosed herein are adaptable to a sidelobe cancelling system utilizing a planar antenna array instead of the linear antenna array described above. A rectangular planar array is depicted in FIG. 8 while means for transforming the antenna outputs, $V_{ij}$, into beamspace outputs, $u_{kl}$, are illustrated in FIG. 9. The $u_{kl}$ may be calculated directly by a digital processor utilizing the following formula $$u_{kl} = 1/N \sum_{m=0}^{N-1} \sum_{n=0}^{N-1} a_{nm} \Gamma_N^{(k-1)n+(l-1)m} V_{nm} \quad (8)$$

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A sidelobe cancelling system comprising:
    an antenna array with N elements;
    first means interconnected with said antenna array for generating a set of N subbeams from said array, each of the mainlobes of said subbeams being oriented at an azimuthal angle $\theta_k$, k=1, ..., N with the output signal of the subbeam oriented at $\theta_k$ being $u_k$;
    second means for selecting a nulling subset of nulling outputs $(x_2, \ldots, x_L)$, where L<N, from the set of subbeam outputs $(u_2, \ldots, u_N)$, where $x_1=u_1$ is the main antenna channel, and where $x_2, \ldots, x_L$ are $u_k$'s necessary to null the effects of jammer signals in the main antenna channel sidelobes including means for selecting a first subbeam, different from the main channel, with a first jammer postioned in the mainlobe thereof and means for determining the number of output functions from subbeams adjacent to said first subbeam necessary to null the signal from said first jammer in the sidelobes of the main channel; and
    third means for processing said nulling outputs in said nulling set to null the effects of jammer signals in the main antenna channel sidelobes.

2. The apparatus recited in claim 1 wherein:
    said first means is a weighted Butler matrix interconnected with said antenna array.

3. The apparatus recited in claim 2 wherein:
    said antenna array is a linear array with N equispaced antenna elements.

4. A sidelobe cancelling system comprising:
    an antenna array with N elements;
    a weighted Butler matrix with N input ports, each input port connected to one of said antenna elements, and with N output ports where the output signal from the kth output port is $u_k$, k=1, ..., N, where $u_K$ is the response of a subbeam of said antenna array oriented at $\theta_k$;
    an adaptive reducing matrix with N−1 inputs connected to the outputs of said weighted Butler matrix for accepting the output function $(u_2, \ldots, u_N)$, said reducing matrix for generating L−1 output nulling signals $(x_2, \ldots, x_L)$ where L <N and where $x_1=u_1$ is the main antenna channel and $(x_2, \ldots, x_L)$ correspond to the $u_k$'s required to null effects of jammer signals in the sidelobes of the main antenna channel including means for selecting a $u_k$, with $k \neq 1$, having a first jamming signal included in the mainlobe thereof comprising
    a DOA circuit for determining the direction-of-arrival (DOA), $\theta_J$, of said first jamming signal,
    a selector circuit interconnected with said DOA circuit for determining an interger M where $u_M$ is the output function with $\theta_M$ closest to $\theta_J$,
    a power-measuring circuit for measuring the power, $P_M$, of $u_M$,
    a bandwidth compensating circuit for receiving said value $P_M$ and for determining a number 2R where 2R is the number of output functions adjacent to said output function $u_M$ required to null said first jamming signal, and
    a switching circuit, interconnected with said selector circuit and said bandwidth compensating circuit for receiving said values of M, from said selector circuit, and 2R, from said bandwith compensating circuit, for directing the output functions $u_{M+h}$, h=0, ..., R to the inputs of said sidelobe canceller and for directing $u_M$ to said power measuring circuit; and
    a sidelobe canceller with inputs for accepting the nulling signals $(x_2, \ldots, x_L)$ and for nulling the effects of jammer signals in the sidelobes of the main antenna channel.

5. The apparatus recited in claim 4 wherein:
    said antenna array is a linear array with N equispaced antenna elements.

6. A method for suppressing signals from unwanted interference sources (jammers) received in the sidelobes of an antenna array with N elements, said methods comprising the steps of:
    generating a set of N subbeams from said array, each of said subbeams being oriented at a azimuthal angle $\theta_k$, k =1, ..., N with the output of the subbeam oriented at $\theta_k$ being $u_k$;
    selecting a nulling subset $(x_2, \ldots, x_L)$, where L<N, from the set of subbeam outputs $(u_1, \ldots, u_N)$ where $x_1=u_1$ is the main antenna channel and where $(x_2, \ldots, x_L)$ are the $u_k$'s necessary to null the effects of jammer signals in the mainbeam sidelobes including the steps of selecting a first subbeam, different from the main channel, with a first jammer positioned in the mainlobe thereof and determining the number of output functions from subbeams adjacent to said first subbeam necessary to null the signal from said first jammer in the sidelobes of the main channel; and
    processing said outputs in said nulling set to null the effects of jammer signals in the main antenna channel sidelobes.

* * * * *